United States Patent
Takali et al.

(10) Patent No.: US 12,179,280 B2
(45) Date of Patent: Dec. 31, 2024

(54) ELECTRODE FEED DEVICE

(71) Applicant: PLENESYS, Valbonne (FR)

(72) Inventors: Sabri Takali, Antibes (FR); Ahmed Kacem, Vallauris (FR)

(73) Assignee: PLENESYS, Valbonne (FR)

( * ) Notice: Subject to any disclaimer, the term of this patent is extended or adjusted under 35 U.S.C. 154(b) by 458 days.

(21) Appl. No.: 17/610,994

(22) PCT Filed: May 11, 2020

(86) PCT No.: PCT/EP2020/063049
§ 371 (c)(1),
(2) Date: Nov. 12, 2021

(87) PCT Pub. No.: WO2020/229408
PCT Pub. Date: Nov. 19, 2020

(65) Prior Publication Data
US 2022/0256683 A1 Aug. 11, 2022

(30) Foreign Application Priority Data
May 13, 2019 (FR) ...................................... 1904940

(51) Int. Cl.
*B23K 10/00* (2006.01)
*H05B 7/102* (2006.01)
*H05H 1/34* (2006.01)

(52) U.S. Cl.
CPC ............. *B23K 10/00* (2013.01); *H05B 7/102* (2013.01); *H05H 1/34* (2013.01)

(58) Field of Classification Search
CPC ............. H05B 7/102; H05B 7/10; H05H 1/34

USPC ...................................................... 219/121.48
See application file for complete search history.

(56) References Cited

U.S. PATENT DOCUMENTS

| 2,174,175 A | * | 9/1939 | Hopkins | ................ B23K 9/121 |
| | | | | 222/23 |
| 2,531,181 A | | 11/1950 | Wilson | |
| 3,484,646 A | | 12/1969 | Purcell | |

FOREIGN PATENT DOCUMENTS

GB 490339 A 8/1938

OTHER PUBLICATIONS

International Search Report issued in corresponding International Application No. PCT/EP2020/063049, dated Aug. 25, 2020, pp. 1-3, European Patent Office, Rijswijk, Netherlands.

(Continued)

*Primary Examiner* — Janie M Loeppke
*Assistant Examiner* — Simpson A Chen
(74) *Attorney, Agent, or Firm* — HAUPTMAN HAM, LLP (57) ABSTRACT

An electrode feed device for a plasma torch installation including an element for fastening an active electrode, movable in translation along a longitudinal axis of the active electrode, wherein it further has a magazine including compartments each adapted to receive an electrode amongst a plurality of additional electrodes, a system or moving the compartments, configured to place an additional electrode amongst the plurality of additional electrodes in alignment with a current active electrode along the longitudinal axis, an assembly device configured to fasten a proximal end of the current active electrode and a distal end of the additional electrode end-to-end, so that they form together a new active electrode.

19 Claims, 4 Drawing Sheets

(56) References Cited

OTHER PUBLICATIONS

Written Opinion issued in corresponding International Application No. PCT/EP2020/063049, dated Aug. 25, 2020, pp. 1-6, European Patent Office, Rijswijk, Netherlands.

* cited by examiner

ELECTRODE FEED DEVICE

The present application is a U.S. National Phase of International Application Number PCT/EP2020/063049, filed May 11, 2020, which claims priority to French Application No. 1904940, filed May 13, 2019.

TECHNICAL FIELD

The invention relates to the field of electrodes for plasma torches. It finds a particularly advantageous application in the field of installations implementing plasma torches for any technology, such as, without limitation, that of carbon black and dihydrogen production from a methane-type gas.

STATE OF THE ART

In plasma torches, one or several electrode(s) are at least partially immersed in the inner volume of a reactor at which electric arcs are produced. There are plasma generators powered with direct current, wherein the electrodes always have the same polarity. There are also plasma generators powered with three-phase current, with three electrodes each assigned to one phase, which alternately serves as an anode and as a cathode. In such case, the plasma torch installation includes three active electrodes immersed in a reactor. Plasma is created in the torch by blowing a plasmagenous gas which is transformed into plasma thanks to the electric discharges.

The electric phenomenon induced in the plasma generators causes an erosion of the active electrodes. Hence, in general, when the active electrodes are used, it is necessary to stop the industrial operation and replace the electrodes before resuming operation.

The patent publication U.S. Pat. No. 1,440,724 A1 discloses a solution that does not require the shutdown of the generator thanks to a growth of the electrode by automatic baking by continuously adding the material of which the electrode is made (graphite, carbon . . . ) with a binder (tar) above the electrode. The heat transferred by the electrode powered with electricity lets the raw material bake until it becomes secured and integral with the electrode. Since the electrode is eroded at the bottom, the entire set is lowered and the process is repeated. The use of this method is limited to very large electrodes (several hundreds of kilograms) and positioned vertically. In addition, the complexity of monitoring of the electrode baking conditions makes the control of the mechanical characteristics of the electrode difficult. Indeed, the break-up of the electrodes in this process is common (sometimes by the effect of their own weight).

Hence, an object of the present invention is to provide a solution for feeding electrodes that overcome all or part of the drawbacks of current techniques.

SUMMARY

To achieve this objective, according to one embodiment, the present invention provides for an electrode feed device for a plasma torch installation, comprising an element for fastening an active electrode, movable in translation along a longitudinal axis of the active electrode.

Advantageously, the invention may further have:
- a magazine comprising compartments each adapted to receive an electrode amongst a plurality of additional electrodes;
- a system for moving the compartments, configured to place an additional electrode amongst the plurality of additional electrodes in alignment with a current active electrode along the longitudinal axis,
- an assembly device configured to fasten a proximal end of the current active electrode and a distal end of the additional electrode end-to-end, so that they form together a new active electrode.

Thus, a stock of additional electrodes in a magazine is provided and these additional electrodes may be successively loaded, by assembly in the continuation of a current active electrode, so as to cover a useful length of an additional electrode. The higher the capacity of the magazine, the more the installation could operate in a fully autonomous manner. In addition, preferably, it is possible to replace the magazine during operation without stopping the plasma generator. This replacement could allow reloading the empty magazine and replacing it on its support, it could also consist of a replacement of the empty magazine with another full magazine. Thus, the capacity of the magazine determines the frequency of replacement of the magazine by an operator but not the duration of operation of the generator. At the same time, the invention does not require the manufacture of an additional electrode portion in situ, and is based on a reload thanks to pre-manufactured additional electrodes, whose quality is well controlled.

Another aspect of the present invention relates to an installation comprising a plasma torch and at least one device according to the invention. Several devices may be present, for example three devices for a three-phase installation. The magazine could serve several devices.

Another aspect of the present invention relates to an electrode feed method for a plasma torch installation, comprising:
- a fastening of a current active electrode, by a fastening element movable in translation along a longitudinal axis of the active electrode;
- a storage of a plurality of additional electrodes in a magazine comprising compartments each adapted to receive an additional electrode of the plurality of additional electrodes;
- a placement of an additional electrode amongst the plurality of additional electrodes in alignment with the current active electrode along the longitudinal axis,
- an assembly configured to fasten a proximal end of the current active electrode and a distal end of the additional electrode end-to-end, so that they form together a new active electrode.

The invention may be configured to produce dihydrogen from a hydrocarbon gas like methane. Thus, a method for producing dihydrogen by hydrocarbon gas cracking using the installation and/or the electrode feed method is also disclosed. Preferably, the production of dihydrogen is not interrupted during a replacement of the magazine such that it could be continuous.

BRIEF DESCRIPTION OF THE FIGURES

The aims, objects, as well as the features and advantages of the invention will appear better from the detailed description of an embodiment of the latter which is illustrated by the following appended drawings wherein.

The drawings are provided as examples and do not limit the invention. They form block diagrams intended to facilitate the understanding of the invention and are not necessarily to the scale of practical applications.

DETAILED DESCRIPTION

Before beginning with a detailed review of embodiments of the invention, optional features that could possibly be used in association or alternatively are set out hereinafter.

the compartments 28 are configured to receive additional electrodes 7 so that they are parallel to each other;

the compartments 28 are configured to receive electrodes so that the electrodes are parallel to the longitudinal axis;

the compartments 28 are organised along a circle, and the actuation system 4 includes a rotational mobility configured to move the compartments 28 along the circle;

the actuation system 4 includes a carousel to which the compartments 28 are secured in rotation, a crown gear 27 secured in rotation to the carousel and a motor-drive 41 configured to drive the crown gear 27;

each of the compartments 28 comprise a screwing member 29, configured to cooperate with a complementary screwing member of the proximal end 71 of each of the additional electrodes 7 of the plurality of additional electrodes 7;

the assembly device comprises an element for moving the screwing member 29 along a first helical movement corresponding to the movement of screwing the screwing member with the complementary screwing member, said screwing movement being directed about the longitudinal axis, the first helical movement being configured to assemble a tapped portion of one amongst the distal end of the additional electrode and the proximal end of the current active electrode 6 by screwing with a threaded portion of, respectively, the other amongst the distal end of the additional electrode 7 and the proximal end of the current active electrode 6, so as to form the new active electrode;

the fastening element 3 is movable along the longitudinal axis of the active electrode 6;

the fastening element is configured to fasten the new active electrode at the additional electrode, after formation of the new active electrode;

the actuation element 5 is configured to operate a second helical movement, opposite to the first helical movement, after fastening of the new active electrode at the additional electrode 7 by the fastening element 3, so as to operate a complete unscrewing movement of the screwing member 29 relative to the complementary screwing member;

the actuation element 5 includes at least one gear wheel and a motor-drive 51 configured to drive the gear wheel;

the fastening element 3 includes a clamp 32 movable between an electrode fastening active position and an electrode release inactive position;

the device includes an active electrode 6 and a plurality of additional electrodes 7, each of said electrodes comprising a first end provided with a tapping and a second end provided with a thread, the tapping of any one of said electrodes being adapted to cooperate by screwing with the thread of any one of the other ones of said electrodes;

the installation comprises a plurality of devices at least two of which share the same magazine 2, said magazine 2 being movable between the at least two devices;

the replacement of the magazine comprises a phase of inserting a magazine 2 provided with a plurality of additional electrodes 7 in a support 1;

the insertion phase is carried out through a translation of the magazine 2 relative to the support 1;

the insertion phase is configured to place a driving toothed portion of the support 1 and a driven toothed portion of the magazine 2 in a meshed position.

The illustrations provided in the different figures essentially relate to the portions of a plasma torch installation located outside the reactor and enabling feeding with electrodes, by communication with the volume of the reactor. Thus, the feed device of the invention may be fixed on the rest of the installation comprising, as such, a reactor and an electric generator enabling the generation of electric arcs throughout a stream, when powering the electrodes. For example, the electrode feed device may be located at an upper end of the installation. In the case of a three-phase installation, three devices according to the invention may be used. In particular, they may be distributed according to 120° angular sectors along the circumference of the reactor, still advantageously at an upper end of the latter. However, an example of a device intended to power several torches is described hereinbelow; the device of the invention may therefore be shared.

According to one possibility, the installation is intended for hydrocarbon cracking. In this context, for example, the reactor, within which the electric arcs producing a plasma based on a vector gas are generated, also receives a hydrocarbon gas, like methane, which through the intense energy supply of the plasma torch undergoes a cracking phenomenon allowing dissociating the molecules of the gas into simpler molecules, for example carbon and dihydrogen.

In general, the installation comprising a plasma torch and an electrode feeder device may comprise a reactor forming an internal volume within which a chemical process is implemented, such as the previously-described cracking.

Advantageously, the reactor will have an internal volume for generating plasma, the electrode feed device being located outside the internal volume and being configured to move the active electrode immersed in the internal volume in translation. Preferably, the internal volume of the reactor is delimited by a wall throughout which the active electrode could be immersed into the internal volume, while being movable from outside said volume. The wall of the reactor includes a passage to this end.

Figure 1:
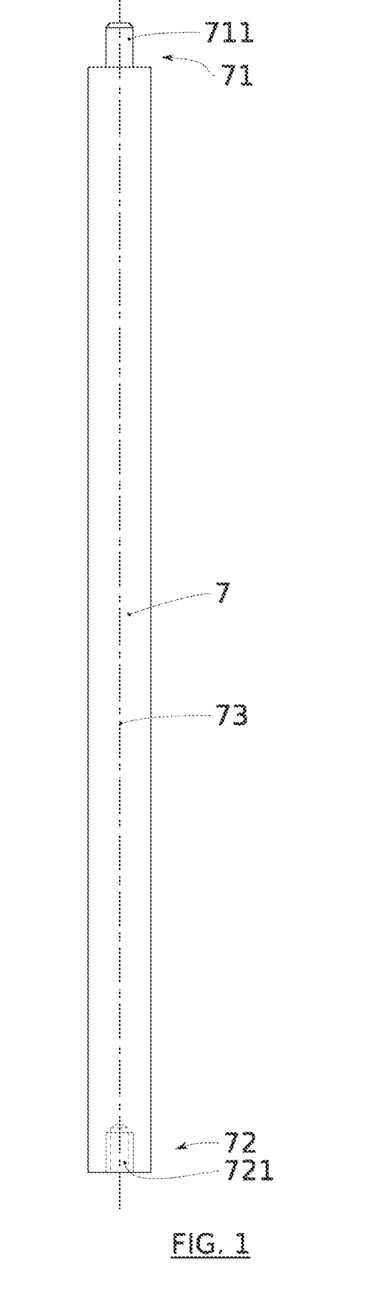
FIG. 1 represents an example of a usable electrode.

FIG. 1 provides an example of an electrode, herein an additional electrode 7, that could be used in the context of the present invention. Typically, the body of the electrode is advantageously a cylinder with a circular cross-section, the extension of the cylinder being done along a longitudinal axis 73. Along this extension, the electrode comprises a proximal end 71 and a distal end, located opposite to the proximal end 72. In the context of the invention, it is advantageous that the electrodes have means for assembly with an equivalent electrode that would be disposed in alignment with the axis 73, so as to allow for a larger overall length of the electrode. To this end, in the example represented in FIG. 1, the proximal end 71 preferably comprises a tapping 711. At the other end, the distal end 72, there is a thread 721. Hence, in this embodiment, it is possible to perform a cooperation of two successive electrodes by screwing. The material of the electrode may be of the type known as such, depending on the considered application.

Moreover, it is advantageous that all the electrodes are identical. However, at the very least, it is desirable that all of them could be successively assembled along the axis 73. Furthermore, it is obvious that the arrangements of the tapped and threaded portions could be reversed.

Figure 2:
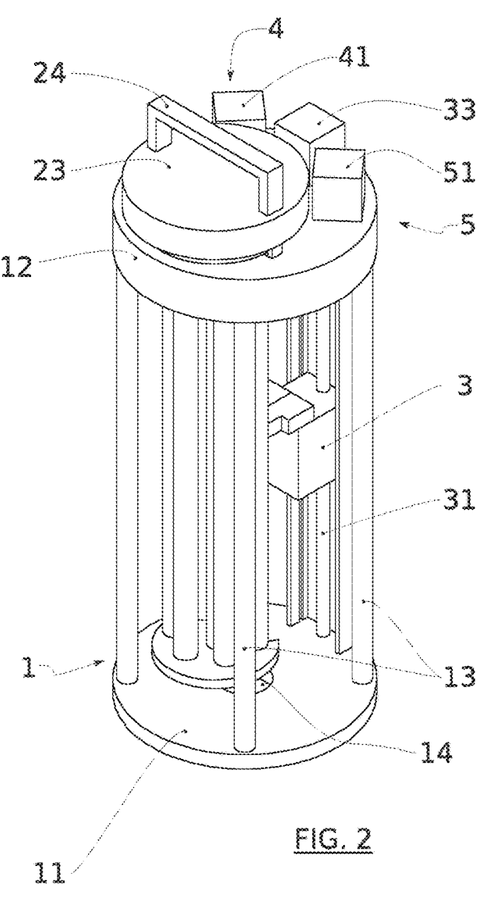
FIGS. 2 and 3 represent the cooperation of a magazine with other portions of the device according to an embodiment of the invention.

FIG. 2 provides an embodiment of the feed device of the invention in perspective. A portion of this device consists of a support that could typically be immobilised with respect to the rest of a plasma torch installation. In the case of the illustrated figure, the support 1 includes a base 11 at a lower portion of the support 1 and an upper portion 12, in an area opposite to the base 11. For example, the base may be fastened on the body of the installation, for example on an outer surface of the reactor defining an internal volume at which the plasma is generated. The coherence of the whole is herein ensured by connecting elements between these two end portions of the support; thus, rods 13 are illustrated extending along the longitudinal axis of the support 1 which, as will be seen later on, advantageously corresponds to the longitudinal axis of movement of an active electrode. Moreover, it will be seen later on that, in a preferred embodiment, the support 1 allows receiving motor-drives and drive portions of elements of the device. Moreover, FIG. 2 shows a magazine 2 mounted in the support 1, herein through the upper portion 12 of the latter. For example, the upper portion 23 of the magazine 2 comprises a grip 24 facilitating gripping of the entire magazine 2 when it is to set in place or to be removed with respect to the support 1.

Figure 3:
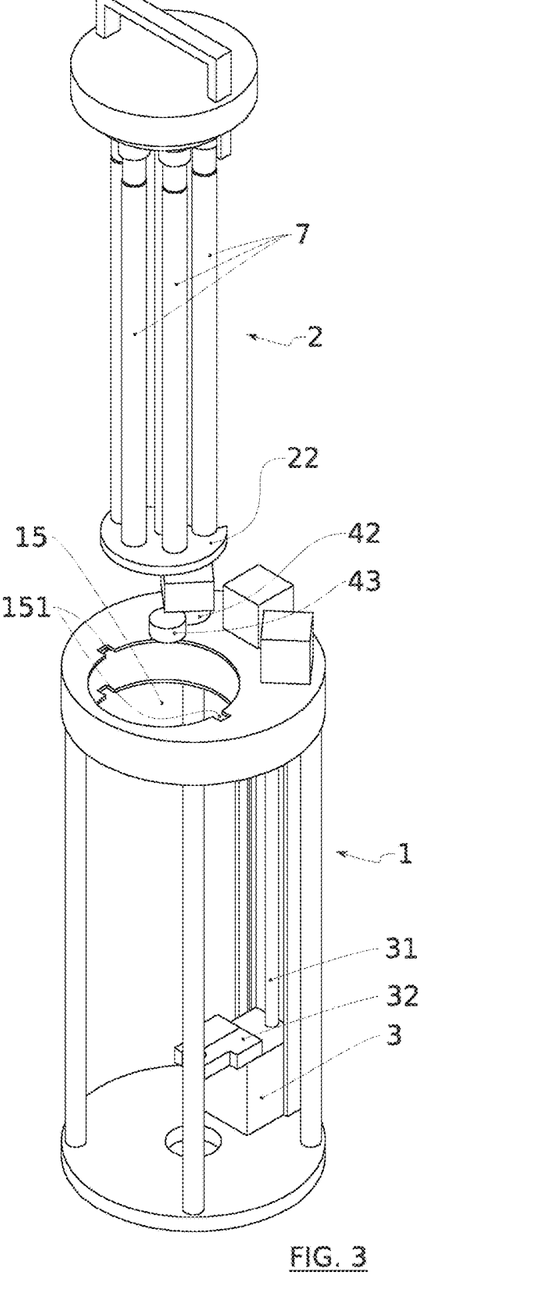

These relative movements between the body of the magazine 2 and the support 1 are shown more particularly in FIG. 3 which shows a removal of the magazine 2. In particular, FIG. 3 shows a hole 15 in the support 1 enabling the insertion of the magazine 2. Furthermore, it is possible that guides 151, for example made in the form of grooves on the wall of the hole 15, ensure a translational guidance of the body of the magazine 2, along the longitudinal direction.

When it is in place, the magazine 2 is in the configuration represented in FIG. 2.

It should be noted that the invention is not limited to magazines 2 in which the storage of the additional electrodes 7 is done according to a circular layout. Neither is it limited to only a rotational mobility of the compartments so as to place an additional electrode in a delivery position. For example, the magazine may be in the form of a removable cartridge in which the additional electrodes 7 are stored parallel to each other and in a plane, the removable cartridge may have a translational movement so as to successively position the compartments of the additional electrodes 7 opposite a mouthpiece of the magazine 2.

Moreover, FIGS. 2, 3, 6 and 7 show that the lower portion of the support 1 enables the movability of an electrode outwardly of the feed device. As example, in this instance, a current active electrode 6 passing throughout an orifice 14 of the base 11 so that its distal end 62 is disposed outwardly of the feed device while its proximal end 61 is located inside is represented. In this manner, the movement of the active electrode 6 may be controlled by the feed device. To this end, the latter comprises a fastening element 3 configured so as to be able to adopt a position secured with the active electrode 6 in a translational direction along the longitudinal axis of the latter. For example, the fastening element 3 comprises a clamp 32 that could be applied on the sidewall of the electrode 6. In another position, the fastening element 3 is inactive so as to release the electrode. In the example of a clamp 32, this can be actuated in particular upon opening so as to move the branches of the clamp away so that they no longer apply a pressure on the wall of the electrode.

To ensure the translational movability of the electrode 6, the fastening element 3, which could serve as a clamp, is movable along this direction. In the illustrated embodiment, this mobility is ensured thanks to a motor-drive 33, typically comprising an electric motor, and by a guide 31 extending along the desired axis of translation and configured to modify the position of the fastening element 3 when the motor is actuated. In the represented example, the principle of a helical slide is used with a tapped rod actuated by the motor cooperating with a base of the fastening element so as to move it. In this example, guide surfaces allow holding the clamp in a situation that enables only the translation along the longitudinal axis. All arrangements allowing ensuring a translational mobility along the longitudinal axis of the gripping element of the electrode (the clamp 32 or another means) are applicable.

It should be understood that the fastening element 3 allows descending a current active electrode 6 progressively, i.e. making it translate outwardly of the device, so as to feed the plasma torch installation. It is also possible to raise it, where needed.

Without the magazine 2, it should be understood that once the active electrode 6 is totally consumed, feeding is necessary with the interruption of the operation of the installation. The present invention overcomes this drawback by the presence of the magazine 2 and of the means associated thereto.

Figure 4:
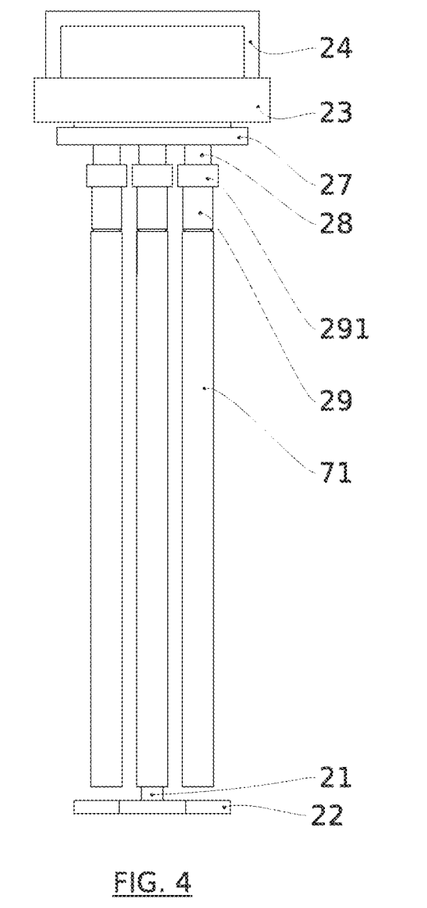
FIGS. 4 to 7 show aspects of the electrode mobility, according to one embodiment.
Figure 5:
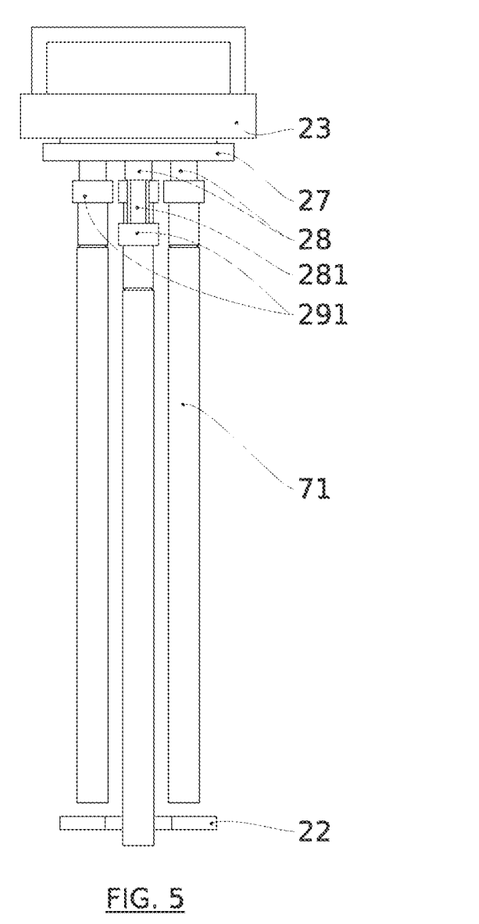
Figure 6:
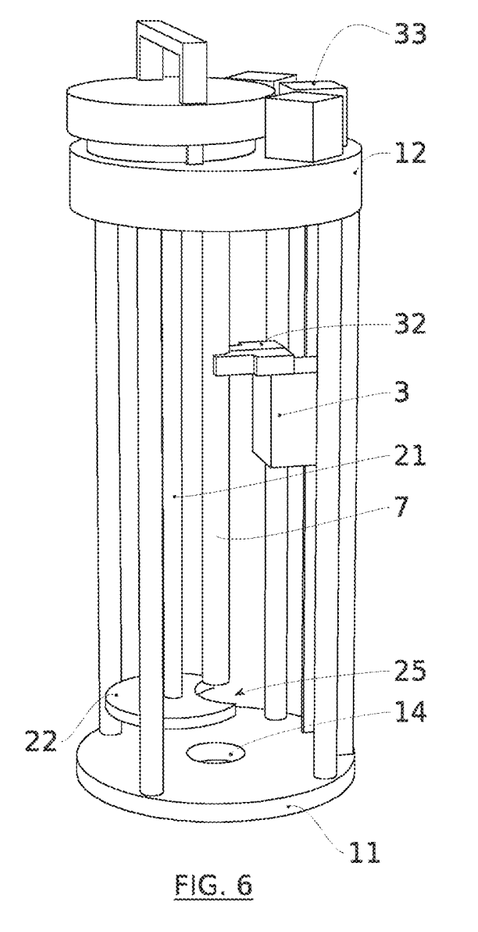
Figure 7:
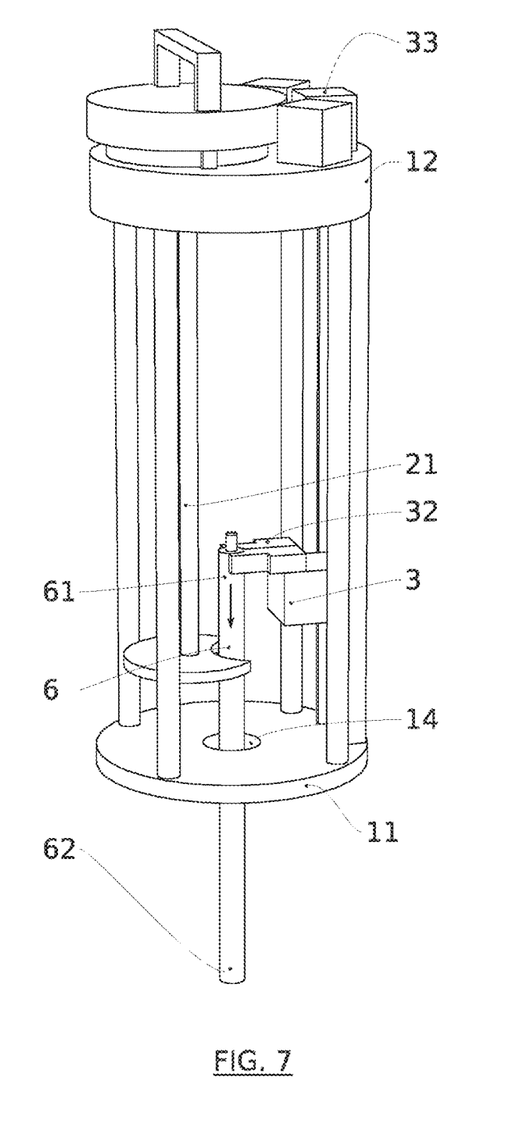

Illustrations of the magazine are visible more particularly in FIGS. 4 and 5. It extends from an upper portion 23 down to a lower portion provided with a base 22 comprising, in turn, a mouthpiece 25, throughout which an additional electrode 7 disposed in the magazine 2 could pass as it arises from FIGS. 6 and 7. Between the upper portion 23 and the base 22, a volume is defined and enables the storage of a plurality of additional electrodes 7. In the represented non-limiting example, six additional electrodes 7 are present, advantageously evenly distributed along the circumference of the magazine which herein has a cylindrical configuration. Each additional electrode is provided with a compartment in the magazine, at which compartment the additional electrode 7 is held in a stored position up to a phase of assembly of this additional electrode with a current active electrode. By active electrode, it should be understood the electrode that is being used in the installation, i.e. that one which projects beyond the feed device, as is the case of the electrode 6, by its distal end 62 in FIG. 7.

Between the upper portion 23 and the base 22, the magazine 2 extends longitudinally, for example along rods visible in FIGS. 2, 3, 6 and 7. A first aspect of the magazine 2 is the capability to move the compartments for fastening the additional electrodes 7 so as to place either one opposite the mouthpiece 25 to enable the delivery in order to be assembled with the current active electrode. To this end, FIGS. 4 and 5 schematise a crown gear 27 secured to the magazine but pivotally mounted relative to the body of the latter, herein at the upper portion 23 relative to which the crown gear is guided in rotation about the longitudinal axis, and adapted to cooperate with an actuation system 4. As regards the actuation system 4, reference may be made to FIGS. 2 and 3. In FIG. 2, it could be noticed a motor-drive 41, always preferably electric, at the output shaft of which is associated a drive pinion 42 (cf. FIG. 3) which, in turn, is connected along a kinematic chain to the gear crown 27. This connection may be achieved through at least one idle pinion 43. Of course, alternative designs are possible, in particular through a drive that is different from that one using gears. A belt system is possible, as well as a direct coupling between the motor output and the crown 27. It should be understood that the control of the motor-drive 41 allows modifying the angular position of the crown gear 27. Yet, the latter carries the compartments receiving the additional electrodes 7, such that the position of these could be modified thanks to the actuation system 4. This design forms a carousel for successive delivery of the electrodes.

In the case of the illustrations, it is possible to control the motor-drive 41 so as to produce a rotation of the crown gear 27 with a 60° angular movability corresponding to the angular deviation between two electrodes, so as to position a next additional electrode opposite the mouthpiece 25.

Moreover, FIGS. 4 and 5 provide an embodiment of the immobilisation of the additional electrodes 7 at the compartments of the magazine 2. In this situation, each compartment 28 includes a tapped portion 281 extending along the longitudinal axis of the additional electrodes. A screwing member 29 cooperates with the tapped portion 281 (through a non-represented thread) which enables a movability of the screwing member 29 along the longitudinal axis. An opposite end of the screwing member 29 cooperates with the proximal end of an additional electrode 7. The latter includes a complementary screwing member (in the example the tapping 711) ensuring, in the storage position, the immobilisation of the electrode 7 with respect to the screwing member 29. The allowed movement between the tapped portion 281 of the compartment 28 and the screwing member 29 may be achieved through an actuation element 5 preferably comprising, in turn, a motor-drive, advantageously an electric one, whose output shaft is equipped with a gear wheel enabling driving of a gear wheel 291 mounted on the screwing member 29 through gears. An example of an actuation element 5 and of the motor-drive 51 is provided in FIG. 2. The actuation element 5 is configured so as to be able to cooperate with the gear wheel 291 of a compartment 28 disposed so that the additional electrode 7 contained therein faces the mouthpiece 25. It should be understood that the rotational drive of a gear wheel 291 allows screwing and unscrewing it relative to the tapped portion 281, and therefore make it, respectively, rise and descend. This induces an equivalent rise or descent movement of the screwing member 29. Preferably, the gear wheel 291 is mounted free in rotation relative to the compartment 28.

The movement induced by the actuation element 5 ensures the passage of the distal end 72 of the additional electrode 7 opposite the mouthpiece 25 outwardly of the magazine 2.

Moreover, it should be understood that, if the considered additional electrode 7 is immobilised in translation by means of the fastening element 3, the reverse drive of the gear wheel 291 produces a movement in the reverse direction along the longitudinal axis (upwards) of the screwing member 29 while the additional electrode 7 can no longer move. Therefore, the latter remains in place and the screwing member 29 is detached from the tapping 711 of the additional electrode 7.

An example of two feed methods that could correspond to phases of use of the device of the invention is given hereinafter.

Beforehand, additional electrodes 7 are set in place in the magazine 2, each at one compartment 28. This could be done by screwing the tappings 711 in a corresponding threaded portion of a lower portion of the screwing member 29. At the same time, the screwing members 29 themselves are completely applied, in the retracted position, on the tappings 281 of the compartments 28.

When the magazine 2 is filled, it is positioned in the support 1, for example by switching from the position of FIG. 3 into the position of FIG. 2.

Moreover, a current active electrode 6 retained by the fastening element 3 might be already in use. It is not excluded that the plasma torch installation remains in operation during the movement of a magazine 2 in the support 1. Indeed, the removal and the replacement of the magazine do not affect the proper operation of the torch, the active electrode remaining in place and potentially in operation during such steps.

As it is consumed, the active electrode 6 is moved downwards (or upwards) by the mobility imparted on the fastening element 3. This movement may be continuous, in general at low speed, or in steps.

Once the fastening element 3 has reached a low position, preferably predetermined, an assembly of an additional electrode 7 with the current active electrode 6 is initiated. To this end, an additional electrode 7 from the magazine 2 is moved in the direction of the active electrode 6. In the case where an additional electrode 7 is already present opposite the mouthpiece 25 of the magazine 2, this operation is performed immediately. If it is not the case, a movement of the compartments 28 (by rotation of the crown gear 27 in the illustrated embodiment) is performed beforehand so as to position an additional electrode 7 opposite the mouthpiece 25.

The additional electrode 7 facing the mouthpiece 25 is moved in the direction of the active electrode 6 through a translation along its longitudinal axis 73, bearing in mind that the relative position of the mouthpiece 25, of the longitudinal action 73 and of the longitudinal axis of the active electrode 6 allow for an alignment of the two electrodes. Moving the additional electrode 7 may be performed through an operation of unscrewing the screwing member 29 relative to the compartment 28, by means of the actuation element 5. The considered additional electrode 7 is then deployed in the direction of the proximal end 61 of the active electrode 6 until setting them end-to-end. Moreover, this movement advantageously achieved at the same time (although it is not excluded that a separate additional phase is present to this end) an assembly between the male and female tapped portions of the ends of the two electrodes 6, 7 set end-to-end.

Now assembled, the electrodes 6 and 7 form a new current active electrode, whose length has been considerably increased.

The considered additional electrode 7 is still to be released from the compartment 28. To this end, the fastening element 3 may be placed in position for detachment from the electrode 6 and then moved upwards until being replaced in the securing position, but this time over a portion of the additional electrode 7 assembled with the electrode 6. Now immobilised, the electrode 7 becomes insensitive to a reverse movement of the motor-drive 52. In this manner, the screwing member 29 is unscrewed off the tapping 711 of the proximal end 71 of the electrode 7, thereby releasing the latter. The screwing member 29 recovers its initial position, retracted with respect to the compartment 28.

The new current active electrode produced in this manner is used again as before, with a progressive translation according to the consumption produced by the use of the plasma installation. The operation of the device is possible even in the case where there was no active electrode 6 initially (an initial start-up situation in particular).

The electrode feed operations could be replicated until the magazine 2 is empty. Afterwards, it could be extracted and filled again.

As shown in particular in FIG. 3, the magazine 2 may be mounted on the support 1 through a translational movement. Advantageously, the drive components of the support 1 (the toothed portions moved by the motor-drive) are set in a meshing situation with the toothed portions of the magazine 2, and in particular the gear wheels 291 and the crown gear 27, during the insertion. For example, in this manner, it is possible to avoid additional steps of setting in a meshing, or declutching, situation, when the magazine is to be changed. Thus, the insertion movement, for example according to a translation of the magazine 2, for example along the longitudinal direction of the electrode could be configured so as to place at least one toothed portion of the magazine 2 and a cooperating toothed portion of the support 1 in a meshing situation.

To this end, it is advantageous that these portions intended to cooperate by meshing do not hinder the insertion of the magazine 2. Thus, preferably, arrangements are made for the toothed portions of the magazine 2 be located the farthest according to the movement of insertion of the magazine 2 to have the greatest bulk and for the toothed portions of the magazine 2 being inserted at first into the support 1 to have the smallest bulk. In the case of the illustrations, typically, the insertion starts with the passage of the gear wheels 291, and then with the set-up of the crown gear 27, which fits within a circle with a larger diameter than the circle within which the gear wheels 291 fit.

In the case corresponding to the figures, the mobilities are ensured by distinct motor means. However, all or part of these mobilities could use common motor means. In particular, the motor-drives 33, 41 and 51 may be replaced by a unique motor-drive cooperating with a disengageable drive system that could be controlled so as to selectively drive the elements of the device (in particular the fastening element 3, the actuation system 4 and the actuation element 5). Preferably, the unique motor-drive selectively meshes with one of the previously-described toothed portions (wheel, pinions or crown). Moreover, it may consist of a controlled magnetic coupling system.

The invention is not limited to the previously-described embodiments and extends all embodiments covered by the claims.

The invention is not limited to the use of a magazine by a feed device. A unique magazine may be used to feed several devices. For example, a unique magazine may be used to feed three active electrodes in a three-phase configuration. In such a situation, the unique magazine may occupy a central position with respect to the three active electrodes. A pivoting system will enable the positioning of the magazine so that the axis of its mouthpiece 25 is in the plane formed by the axis of the active electrode to be reloaded and the axis of the plasma torch installation. In this plane, an additional rotation will enable the alignment of the additional electrode 7 with the active electrode 6 and trigger the sequence of securing these two electrodes. In another embodiment, the device may comprise several mouthpieces each opposite one active electrode. In this case, the magazine does not have to perform the additional rotation. This configuration is particularly suited to large-sized electrodes where the magazine cannot be handled by an operator.

LIST OF THE REFERENCES

1. Support
11. Base
12. Upper portion
13. Rod
14. Orifice
15. Hole
151. Guide
2. Magazine
21. Shaft
22. Base
23. Upper portion
24. Grip
25. Mouthpiece
27. Crown gear
28. Compartment
281. Tapped portion
29. Screwing member
291. Gear wheel
3. Fastening element
31. Guide
32. Clamp
33. Motor-drive
4. Moving system
41. Motor-drive
42. Drive pinion
43. Idle pinion
5. Moving element
51. Motor-drive
6. Current active electrode
61. Proximal end
62. Distal end
7. Additional electrode
71. Proximal end
711. Tapping
72. Distal end
721. Thread
73. Axis

The invention claimed is:

1. An electrode feed device for a plasma torch installation, comprising a fastening element for fastening an active electrode, movable in translation along a longitudinal axis of the active electrode, wherein further comprising:
    a magazine comprising compartments each adapted to receive an electrode amongst a plurality of additional electrodes;
    a support adapted to be immobilised relative to the rest of the installation and receiving the magazine in a removable manner;
    an actuation system for moving the compartments, configured to place an additional electrode amongst the plurality of additional electrodes in alignment with a current active electrode along the longitudinal axis,
    an assembly device configured to fasten a proximal end of the current active electrode and a distal end of the additional electrode end-to-end, so that they form together a new active electrode.

2. The device according to claim 1, wherein the compartments are configured to receive additional electrodes so that they are parallel to each other.

3. The device according to claim 2, wherein the compartments are configured to receive electrodes so that the electrodes are parallel to the longitudinal axis.

4. The device according to claim 2, wherein the compartments are organised along a circle, and wherein the actuation system includes a rotational mobility configured to move the compartments along the circle.

5. The device according to claim 4, wherein the actuation system includes a carousel to which the compartments are secured in rotation, a crown gear secured in rotation to the carousel and a motor-drive configured to drive the crown gear.

6. The device according to claim 1, wherein each of the compartments comprise a screwing member, configured to cooperate with a complementary screwing member of the proximal end of each of the additional electrodes of the plurality of additional electrodes.

7. The device according to claim 6, wherein the assembly device comprises an actuation element for moving the screwing member along a first helical movement corresponding to the movement of screwing the screwing member with the complementary screwing member, said screwing movement being directed about the longitudinal axis, the first helical movement being configured to assemble a tapped portion of one amongst the distal end of the additional electrode and the proximal end of the current active electrode by screwing with a threaded portion of, respectively, the other amongst the distal end of the additional electrode and the proximal end of the current active electrode, so as to form the new active electrode.

8. The device according to claim 7, wherein the fastening element is configured to be moved along the longitudinal axis so as to fasten the new active electrode at the additional electrode, after formation of the new active electrode.

9. The device according claim 8, wherein the actuation element is configured to operate a second helical movement, opposite to the first helical movement, after fastening of the new active electrode at the additional electrode by the fastening element, so as to operate a complete unscrewing movement of the screwing member relative to the complementary screwing member.

10. The device according to claim 7, wherein the actuation element includes at least one gear wheel and a motor-drive configured to drive the gear wheel.

11. The device according to claim 1, wherein the fastening element includes a clamp movable between an electrode fastening active position and an electrode release inactive position.

12. The device according to claim 1, including the active electrode and the plurality of additional electrodes, each of said electrodes comprising a first end provided with a tapping and a second end provided with a thread, the tapping of any one of said electrodes being adapted to cooperate by screwing with the thread of any one of the other ones of said electrodes.

13. An installation comprising a plasma torch and at least one device according to claim 1.

14. The installation according to claim 13, wherein the at least one device is a plurality of devices at least two of which share the same magazine, said magazine being movable between the at least two devices.

15. The installation according to claim 13, comprising a reactor having an internal volume for generating plasma, the electrode feed device being located outside the internal volume and being configured to move the active electrode immersed in the internal volume in translation.

16. An electrode feed method for a plasma torch installation, comprising:
  a fastening of a current active electrode, by a fastening element movable in translation along a longitudinal axis of the active electrode;
  a storage of a plurality of additional electrodes in a magazine comprising compartments each adapted to receive an additional electrode of the plurality of additional electrodes;
  a placement of an additional electrode amongst the plurality of additional electrodes in alignment with the current active electrode along the longitudinal axis,
  an assembly configured to fasten a proximal end of the current active electrode and a distal end of the additional electrode end-to-end, so that they form together a new active electrode,
  a magazine replacement during the operation of the plasma torch.

17. The method according to claim 16, wherein the replacement of the magazine comprises a phase of inserting the magazine provided with the plurality of additional electrodes in a support.

18. The method according to claim 17, wherein the insertion phase is carried out through a translation of the magazine relative to the support.

19. The method according to claim 17, wherein the insertion phase is configured to place a driving toothed portion of the support and a driven toothed portion of the magazine in a meshed position.

* * * * *